(12) United States Patent
Ebenezer et al.

(10) Patent No.: US 11,508,379 B2
(45) Date of Patent: Nov. 22, 2022

(54) ASYNCHRONOUS AD-HOC DISTRIBUTED MICROPHONE ARRAY PROCESSING IN SMART HOME APPLICATIONS USING VOICE BIOMETRICS

(71) Applicant: Cirrus Logic International Semiconductor Ltd., Edinburgh (GB)

(72) Inventors: Samuel P. Ebenezer, Mesa, AZ (US); Ghassan Maalouli, Mesa, AZ (US)

(73) Assignee: Cirrus Logic, Inc., Austin, TX (US)

( * ) Notice: Subject to any disclaimer, the term of this patent is extended or adjusted under 35 U.S.C. 154(b) by 434 days.

(21) Appl. No.: 16/703,815

(22) Filed: Dec. 4, 2019

(65) Prior Publication Data

US 2021/0174811 A1    Jun. 10, 2021

(51) Int. Cl.
| | | |
|---|---|---|
| *G10L 17/00* | (2013.01) | |
| *G10L 21/0208* | (2013.01) | |
| *H04R 1/40* | (2006.01) | |
| *H04W 84/18* | (2009.01) | |

(52) U.S. Cl.
CPC .......... *G10L 17/00* (2013.01); *G10L 21/0208* (2013.01); *H04R 1/406* (2013.01); *H04W 84/18* (2013.01)

(58) Field of Classification Search
CPC .. H04R 3/005; H04R 1/406; H04R 2201/405; H04R 2430/25; G10L 17/00; G10L 21/0208; G10L 21/0216; G10L 25/78; G10L 2021/02166; H04W 84/18; G10H 1/0008; G01S 3/80; H04M 3/5235
USPC ........................................................ 704/246
See application file for complete search history.

(56) References Cited

U.S. PATENT DOCUMENTS

| | | | |
|---|---|---|---|
| 9,293,140 | B2 | 3/2016 | Chen et al. |
| 9,313,336 | B2 | 4/2016 | Ganong, III et al. |
| 9,390,723 | B1 | 7/2016 | McDonough, Jr. et al. |
| 9,607,603 | B1 | 3/2017 | Evenezer |
| 9,626,970 | B2 | 4/2017 | Huang et al. |
| 10,414,377 | B2 | 9/2019 | Hoyos et al. |
| 2016/0112569 | A1* | 4/2016 | Timem ................ H04M 3/5235 379/88.02 |
| 2017/0338903 | A1* | 11/2017 | Oldfield ................ H04H 60/04 |
| 2018/0040323 | A1 | 2/2018 | Lesso et al. |
| 2019/0096429 | A1 | 3/2019 | Kovvali et al. |

\* cited by examiner

*Primary Examiner* — Md S Elahee
(74) *Attorney, Agent, or Firm* — E. Alan Davis; James W. Huffman

(57) ABSTRACT

Voice biometrics scoring is performed on received asynchronous audio outputs from microphones distributed at ad hoc locations to generate confidence scores that indicate a likelihood of an enrolled user speech utterance in the output, a subset of the outputs is selected based on the confidence scores, and the subset is spatially processed to provide audio output for voice application use. Alternatively, asynchronous spatially processed audio outputs and corresponding biometric identifiers are received from corresponding devices distributed at ad hoc locations, audio frames of the outputs are synchronized using the biometric identifiers, and the synchronized frames are coherently combined. Alternatively, uttered speech associated with respective ad hoc distributed devices is received and non-coherently combined to generate a final output of uttered speech. The uttered speech is recognized from respective spatially processed outputs generated by the respective devices using biometrics of talkers enrolled by the devices.

21 Claims, 8 Drawing Sheets

ASYNCHRONOUS AD-HOC DISTRIBUTED MICROPHONE ARRAY PROCESSING IN SMART HOME APPLICATIONS USING VOICE BIOMETRICS

BACKGROUND

Voice assistants in homes are becoming ubiquitous. Typically, the voice assistant device includes an array of synchronous microphones whose locations relative to one another are known by design. As a result, location information of an acoustic source can be derived by calculating acoustic delays between the microphones of the array. Here, the outputs of the different microphones in the array are synchronous to one another, i.e., they are sampled using the same clock signal and the microphones are of the same type resulting in similar phase responses. These characteristics enable the device to take advantage of the spatial diversity of its microphone outputs to perform spatial processing to produce a processed output suitable for voice processing applications. Generally speaking, having more microphones in the array is directly proportional to the performance gain of a spatial processing method that will lead to improved user experience in voice applications, for example higher phrase recognition rate in speech recognition applications.

The use of a voice interface for use in automatic speech recognition in smart home applications is growing beyond voice assistants. Various devices in homes now come with microphones, e.g., smart televisions (TV), smart appliances, smart speakers, and voice assistants. With the proliferation of such devices, microphones from all these devices can be used in a collaborative manner to enhance voice response performance. For example, TV noise can be reduced by using the microphone in the TV for noise cancellation by cleaning up the noisy signal from another device located closer to the inquiring talker. However, this presents challenges.

One challenge is that the home environment may contain speech-like interference, for example from TV, as mentioned. Another challenge is that spatial cues from the distributed microphones are difficult to derive for at least two reasons. First, the distributed microphones are sampled at different clock frequencies resulting in unknown relative phase response. Second, the location of the distributed microphones is ad hoc, i.e., unknown.

SUMMARY

Embodiments are described that use voice biometric information to detect when the inhabitant (enrolled talker) of a home is speaking. The system uses speaker identification cues in order to process microphones signals that are distributed in ad hoc locations and are asynchronously sampled. Voice biometric scoring is used to perform spatial processing of the multiple, ad hoc located and asynchronously sampled microphones.

In one embodiment, the present disclosure provides a method that includes receiving multiple asynchronous audio outputs from multiple microphones distributed at ad hoc locations and performing voice biometrics scoring to generate a confidence score for each of the multiple asynchronous audio outputs. The confidence score indicates a likelihood of speech utterance of an enrolled user in the asynchronous audio output. The method also includes selecting a subset of the multiple asynchronous audio outputs based on the confidence scores and performing spatial processing of the selected subset of the multiple asynchronous audio outputs to provide processed audio output for use by a voice application.

In another embodiment, the present disclosure provides a method that includes receiving an asynchronous plurality of spatially processed audio outputs and a corresponding plurality of biometric identifiers from a corresponding plurality of devices that are distributed at ad hoc locations, synchronizing audio frames of the asynchronous plurality of spatially processed audio outputs using the plurality of biometric identifiers, and combining the synchronized audio frames to generate a coherently combined audio output for use by a voice application.

In yet another embodiment, the present disclosure provides a method that includes receiving a plurality of uttered speech associated with a respective plurality of devices that are distributed at ad hoc locations within a home. The plurality of uttered speech is recognized from a respective plurality of spatially processed outputs generated by the respective plurality of devices using biometrics of talkers enrolled by the plurality of devices. The method also includes combining the plurality of uttered speech to generate a final output of uttered speech.

In yet another embodiment, the present disclosure provides a non-transitory computer-readable storage medium having computer-executable instructions stored thereon that, when executed by processor circuitry, cause the processor circuitry to perform a method that includes receiving multiple asynchronous audio outputs from multiple microphones distributed at ad hoc locations and performing voice biometrics scoring to generate a confidence score for each of the multiple asynchronous audio outputs. The confidence score indicates a likelihood of speech utterance of an enrolled user in the asynchronous audio output. The method also includes selecting a subset of the multiple asynchronous audio outputs based on the confidence scores and performing spatial processing of the selected subset of the multiple asynchronous audio outputs to provide processed audio output for use by a voice application.

DETAILED DESCRIPTION

Figure 1A:
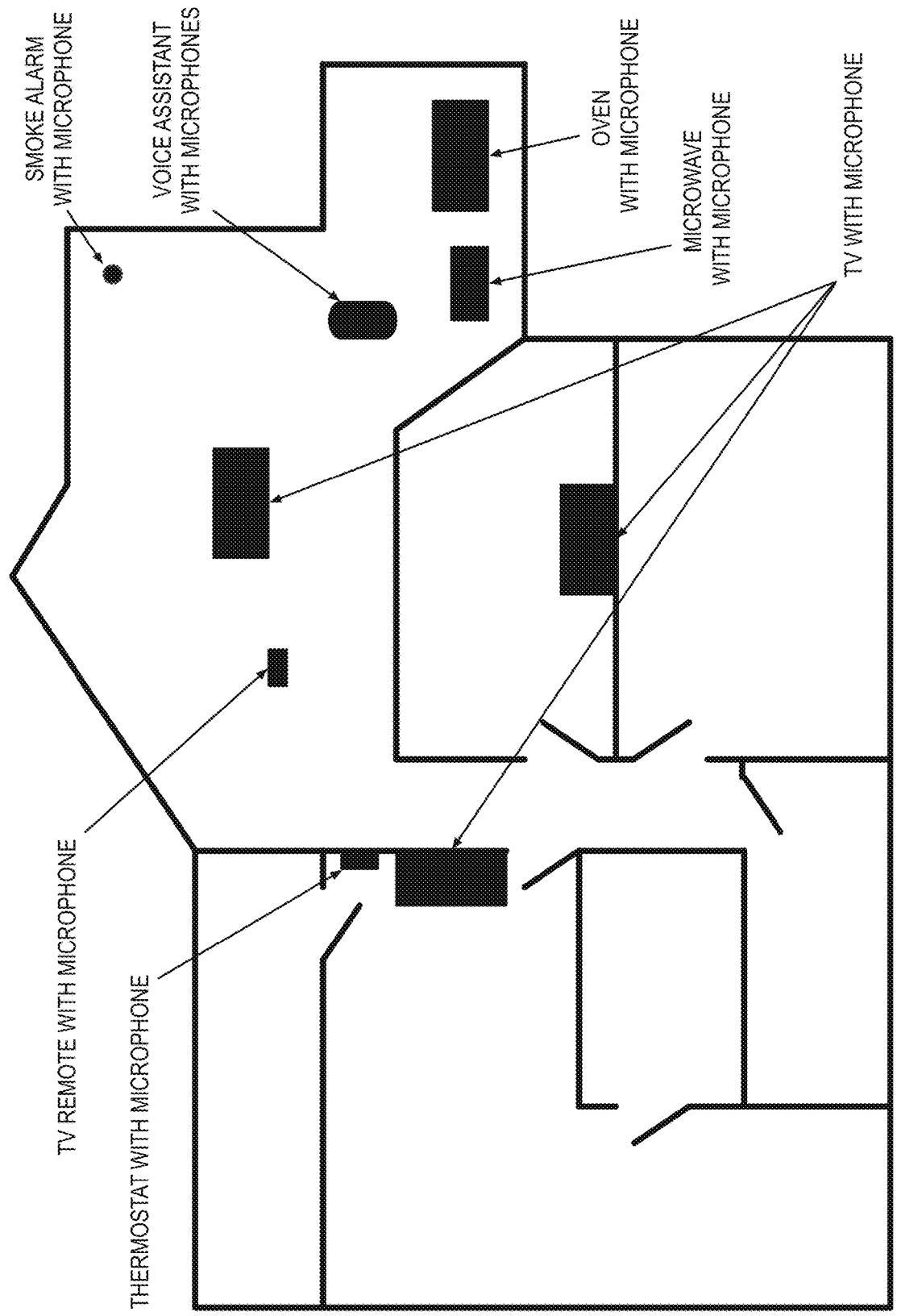
FIG. 1A is an example of a home having an array of asynchronously sampled microphones distributed in multiple devices in ad hoc locations for which voice biometric cues are used to prune the asynchronous microphone outputs and to perform spatial processing on the pruned set of microphone outputs in accordance with embodiments of the present disclosure.

FIG. 1A is an example of a home having an array of asynchronously sampled microphones distributed in multiple devices in ad hoc locations for which voice biometric cues are used to prune the asynchronous microphone outputs and to perform spatial processing on the pruned set of microphone outputs in accordance with embodiments of the present disclosure. The home is shown with multiple rooms and multiple devices each having one or more microphones, e.g., thermostat, convection oven, microwave oven, smoke alarm, TV remote, multiple TVs, and voice assistant. Some of the distributed devices may be located in different rooms and some of the devices may be located in the same room, and the location of some devices may be dynamic, e.g., TV remote, voice assistant.

The multiple microphones are asynchronously sampled, e.g., for analog-to-digital conversion. That is, the outputs of microphones in different devices are sampled using clock signals that are not synchronized. For example, the voice assistant may have its own clock signal used to sample the outputs of its microphones, the thermostat may have its own clock signal used to sample the output of its microphone, the TV remote may have its own clock signal used to sample the output of its microphone, and so forth. Conventionally, a device that performs spatial processing for speech recognition employs spatial cues afforded to it by the synchronous nature of its own microphone outputs. However, the fact that the microphone outputs from the different devices are asynchronous to one another in the described embodiments deprives the spatial processing device of those spatial cues. To address this deprivation, while still taking advantage of the spatial diversity afforded by the availability of an array of microphone outputs from the distributed devices, the embodiments described employ voice biometric scoring to aid in the spatial processing of the asynchronous microphone outputs to produce a clean processed output to aid in speech processing, e.g., speech recognition.

The home also includes multiple noise sources, e.g., appliances, TVs, sinks, faucets, as well as people (not shown), i.e., talkers. The talkers may be enrolled by one or more of the devices used in the performance of speech recognition. For example, the voice assistant may enroll the inhabitants of the home by storing voice biometric information for each of them and associating a unique identifier with each talker's voice biometric information. The voice assistant (or other device) subsequently uses the stored voice biometric information to perform voice biometric scoring to generate a confidence score for each of the microphone outputs that indicates the likelihood that speech of one of the enrolled talkers is present in the microphone output. The voice assistant (or other device) then uses the confidence scores to perform spatial processing on the asynchronous microphone outputs from the distributed devices in the home to generate a processed output. The voice assistant (or other device) then uses the processed output to perform speech recognition or sends the processed output to a server that performs speech recognition, e.g., to a cloud server via the Internet. In one embodiment, the device that performs the voice biometric scoring obtains the outputs of the different microphones via Wi-Fi or other local area network.

Additionally, the microphones in the array are distributed in ad hoc locations. That is, the device performing the spatial processing does not know the location of the different microphones relative to one another, except possibly for its own microphones. Furthermore, the different microphones in the different devices may be of different types and therefore have different phase response characteristics further adding to their asynchronous characteristic. The asynchronous characteristic may be even further increased if the devices perform different pre-processing, e.g., filtering, before or after converting their respective microphone outputs to the digital domain and before the microphone outputs are obtained by the device that performs the voice biometric scoring. Also, the different proximities of the talker to the different microphones affects the amount of the talker's speech present in the different microphone outputs. Finally, there may be reverberation within one or more of the rooms and in the home generally that affects the amount of the talker's speech present in the different microphone outputs. These factors may contribute to variation in the biometric confidence scores for the different microphone outputs. Therefore, the device performing the voice biometric scoring first prunes the microphone outputs to eliminate from the spatial processing the microphone outputs having a low confidence score, e.g., below a threshold.

In one embodiment, a device may include multiple microphones, and those microphones may be sampled synchronously, and the device may perform spatial processing on its own synchronous microphone outputs to generate a processed output that is asynchronous to the processed outputs of the other devices. In such an embodiment, a voice biometric confidence score is generated for each of the asynchronous processed outputs, as described below in more detail.

Figure 1B:
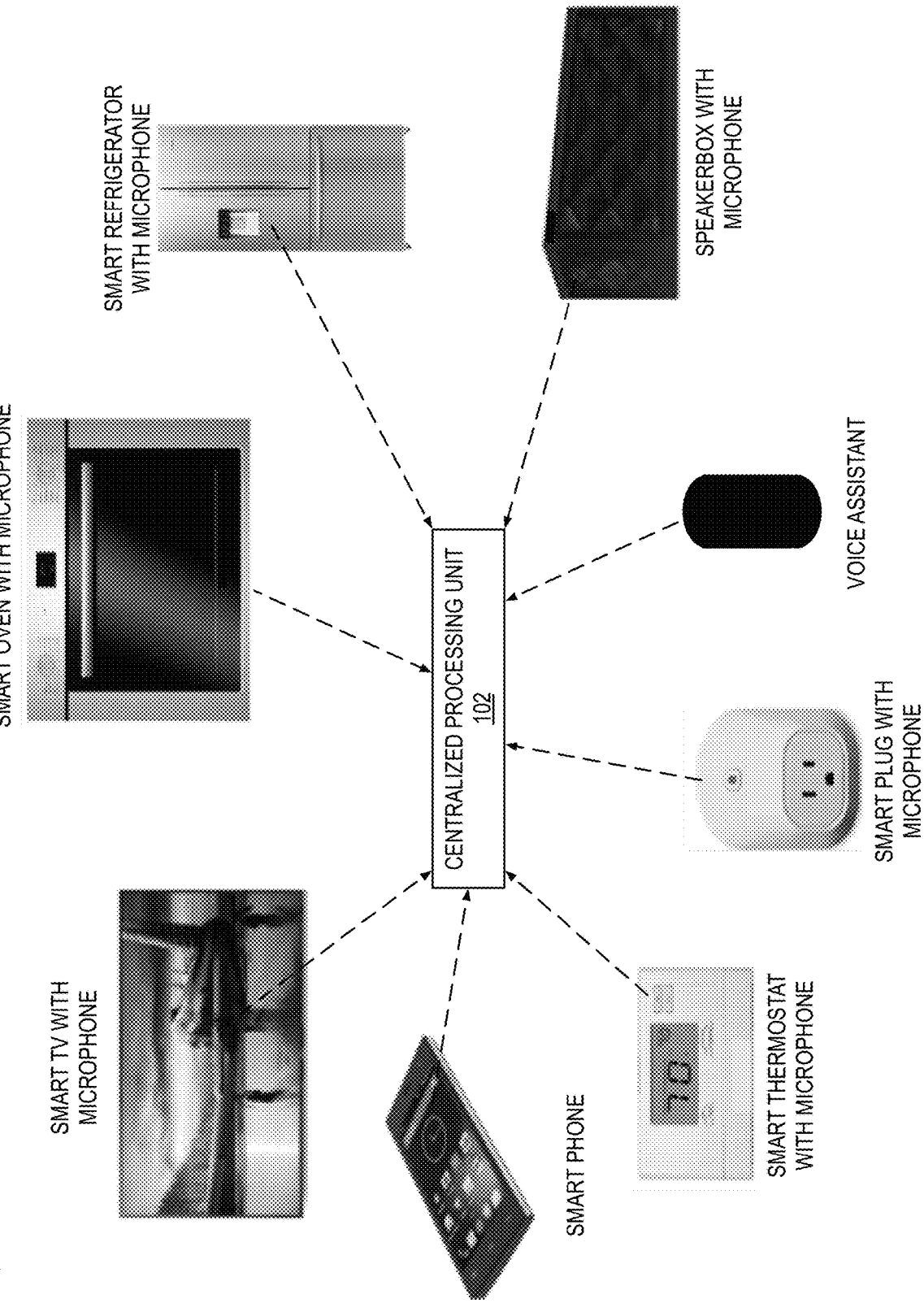
FIG. 1B is an example of a centralized processing embodiment for processing an asynchronous ad-hoc distributed microphone array using biometrics in accordance with embodiments of the present disclosure.

FIG. 1B is an example of a centralized processing embodiment for processing an asynchronous ad-hoc distributed microphone array using biometrics in accordance with embodiments of the present disclosure. An array of devices each having a microphone that generates a microphone signal is shown. The microphone signal may be converted to a digital form. In FIG. 1B, the example array of devices includes a smart TV, a smart oven, a smart refrigerator, a speakerbox, a voice assistant, a smart plug, a smart thermostat, and a smart phone. Each device transmits its microphone signal to the centralized processing unit 102 via short range communication, e.g., via WiFi. The centralized processing unit 102 then performs various functions described herein, e.g., voice biometric processing, microphone pruning, biometric voice activity detection, spatial processing, speech recognition, dereverberation, biometric frame synchronization, timing synchronization, coherent combining, non-coherent combining, etc. on the microphone signals received from the devices. In one embodiment, the centralized processing unit 102 then provides the processed audio output to a voice service. In one embodiment, the centralized processing unit 102 may provide a spatially processed audio output to a downstream voice application, e.g., to a cloud server to perform speech recognition. In one embodiment, the centralized processing unit 102 may perform speech recognition and provide a decision of uttered speech to a voice application, e.g., a voice control application.

Figure 1C:
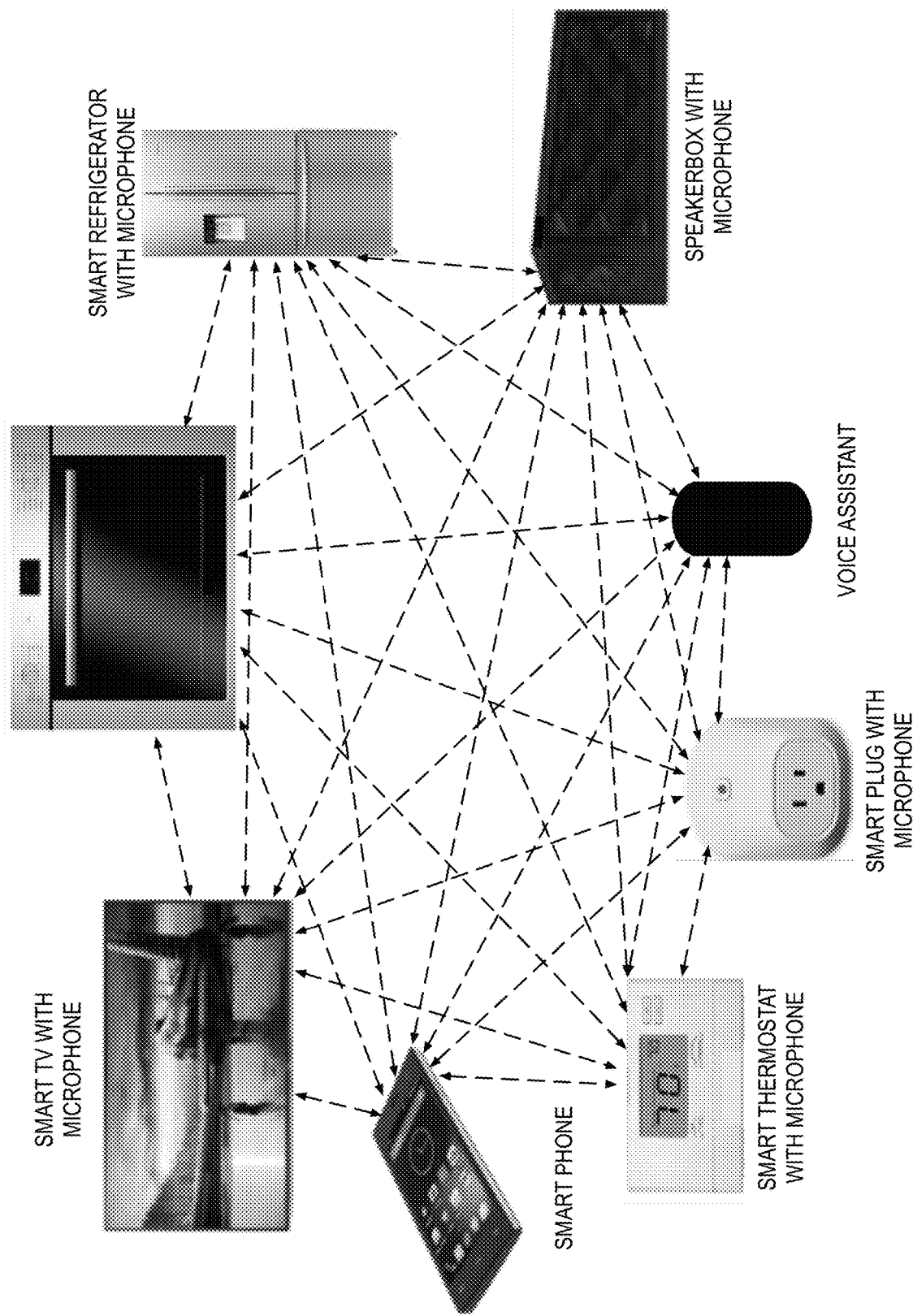
FIG. 1C is an example of a distributed processing embodiment for processing an asynchronous ad-hoc distributed microphone array using biometrics in accordance with embodiments of the present disclosure.

FIG. 1C is an example of a distributed processing embodiment for processing an asynchronous ad-hoc distributed microphone array using biometrics in accordance with embodiments of the present disclosure. FIG. 1C shows an array of the same devices as FIG. 1B. However, the centralized processing unit 102 is absent in the embodiment of FIG. 1C. Instead, each device transmits its microphone signal to each of the other devices via short range communication, e.g., via WiFi. One or more of the devices then performs various functions described herein, e.g., voice biometric processing, microphone pruning, biometric voice activity detection, spatial processing, speech recognition, dereverberation, biometric frame synchronization, timing synchronization, coherent combining, non-coherent combining, etc. on the microphone signals received from the devices. In one embodiment, the one or more devices then provides the processed audio output to a voice service. In one embodiment, the one or more devices may provide a spatially processed audio output to a downstream voice application, e.g., to a cloud server to perform speech recognition. In one embodiment, the one or more devices may perform speech recognition and provide a decision of uttered speech to a voice application, e.g., a voice control application.

Figure 2:
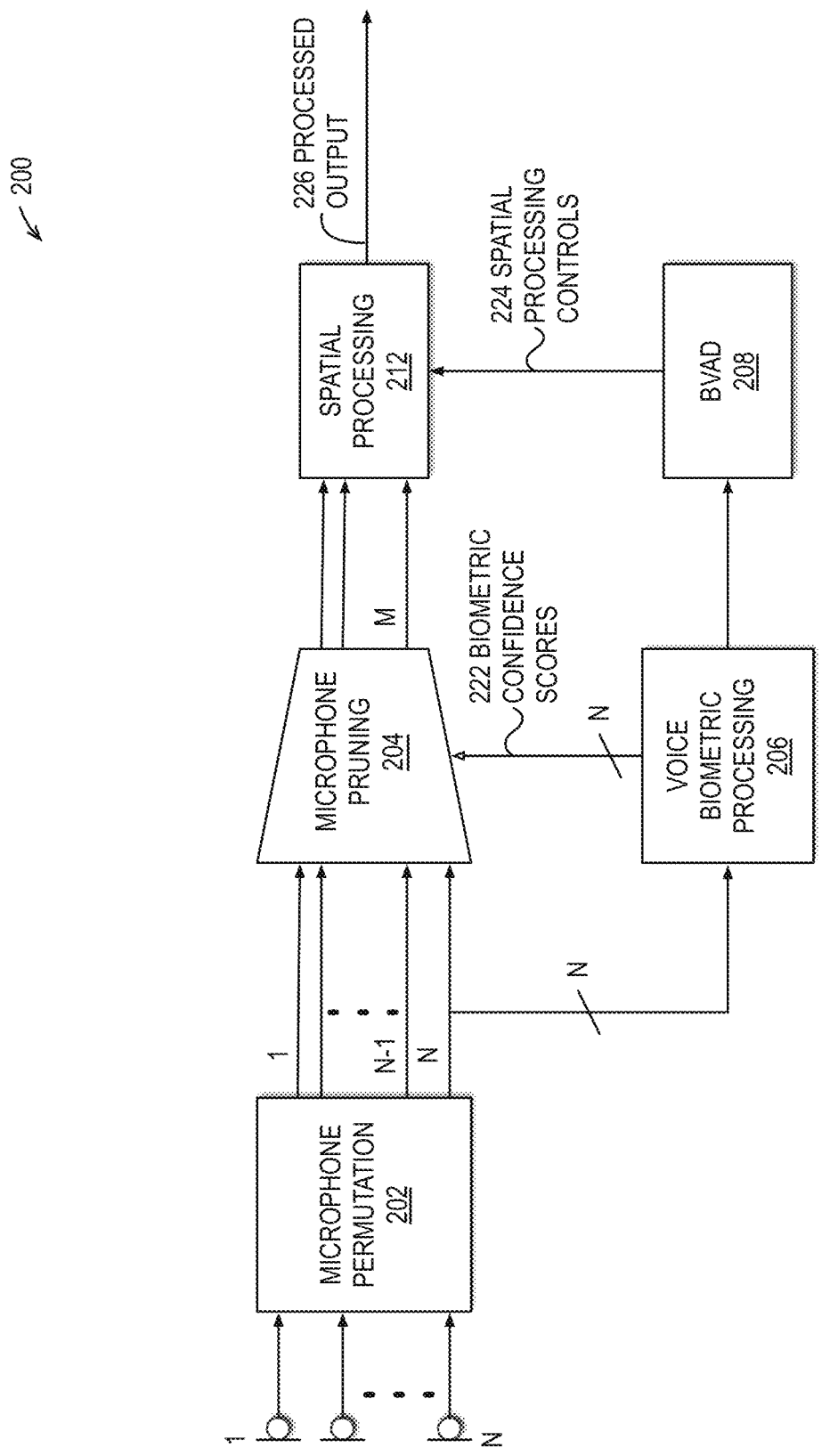
FIG. 2 is an example of a voice interface that uses voice biometric confidence scores to prune asynchronous microphone outputs and to perform spatial processing on the pruned set of microphone outputs in accordance with embodiments of the present disclosure.

FIG. 2 is an example of a voice interface 200 that uses voice biometric confidence scores to prune asynchronous microphone outputs and to perform spatial processing on the pruned set of microphone outputs in accordance with embodiments of the present disclosure. The voice interface 200 includes a plurality of ad hoc microphones (denoted 1 through N) and associated asynchronous microphone audio outputs, a microphone permutation block 202, a microphone pruning block 204, a voice biometric processing block 206, a biometrics voice activity detector (BVAD) 208, and a spatial processing block 212. The microphone permutation block 202 receives the N microphone outputs and enables permutation of indexes of the N microphones. The permutation may include reordering/selection of the N microphones. For example, if the microphones in a device are closely located, then perhaps only one of the microphones is usable for asynchronous processing. Similarly, devices may be located far away from acoustic sources (e.g. alarms in ceilings). The microphones from such devices can be ordered accordingly to prioritize the importance of a microphone with respect to its ability to impart useful information. The N permuted microphone outputs are provided to the voice biometric processing block 206 and to the microphone pruning block 204.

The voice biometric processing block 206 performs voice biometric scoring on the N permuted asynchronous microphone outputs to generate a confidence score 222 for each of the microphone outputs. Each confidence score 222 indicates a likelihood that speech of an enrolled talker, or user, is present in the associated microphone output. Generation of the voice biometric scoring is described in more detail below, e.g., with respect to FIG. 3.

As described in more detail below, e.g., with respect to FIG. 4, the spatial processing may select a voice microphone having the most speech of the enrolled talker and then attempt to remove noise from the selected microphone output using the outputs of the unselected microphones. Generally speaking, microphones far away from the enrolled talker tend not to be as effective in reducing noise (e.g., by a beamformer described below) as microphones close to the enrolled talker because noise in the far microphones tends to be uncorrelated with noise in the close microphones. The confidence score 222 may indicate the proximity of the associated microphone to the enrolled talker. The microphone pruning block 204 selects a subset M of the N permuted microphone outputs based on the degree of confidence indicated by the confidence scores 222. In one embodiment, the microphone pruning block 204 selects only microphone outputs having a confidence score 222 above a threshold. Thus, M may be a dynamic value. In another embodiment, M is a static value and the microphone pruning block 204 selects the M microphone outputs with the highest confidence scores. The microphone output with the largest confidence score may be selected as the main, or primary, voice microphone for spatial processing.

The spatial processing block 212 receives and performs spatial processing on the selected subset of M microphone outputs to generate a processed output 226 that may be used by other speech processing elements, e.g., a speech recognition block either of the device that includes the voice interface 200 or of a server to which the voice interface 200 provides the processed output 226, e.g., via the Internet. Embodiments of the spatial processing are described in more detail below, e.g., with respect to FIG. 4. The voice biometric processing block 206 also provides information to the BVAD 208, which the BVAD 208 uses to generate spatial processing controls 224 for the spatial processing block 212, as described in more detail below, e.g., with respect to FIG. 4, such as signals that tell the spatial processing block 212 when to adapt filters of different portions of a beamformer. The information provided by the voice biometric processing block 206 enables the BVAD 208 to know whether or not the talker is a desired talker. As described below, if the talker is a desired talker, the BVAD 208 enables the adaptation of the matched filter parameters (e.g., ABM filters of FIG. 4); otherwise, the BVAD 208 enables adaptation of the noise canceler filter parameters (e.g., SLC filters of FIG. 4). The BVAD 208 is true when the likelihood of enrolled talker speech presence is above certain threshold (e.g., as determined at block 308 of FIG. 3).

Figure 3:
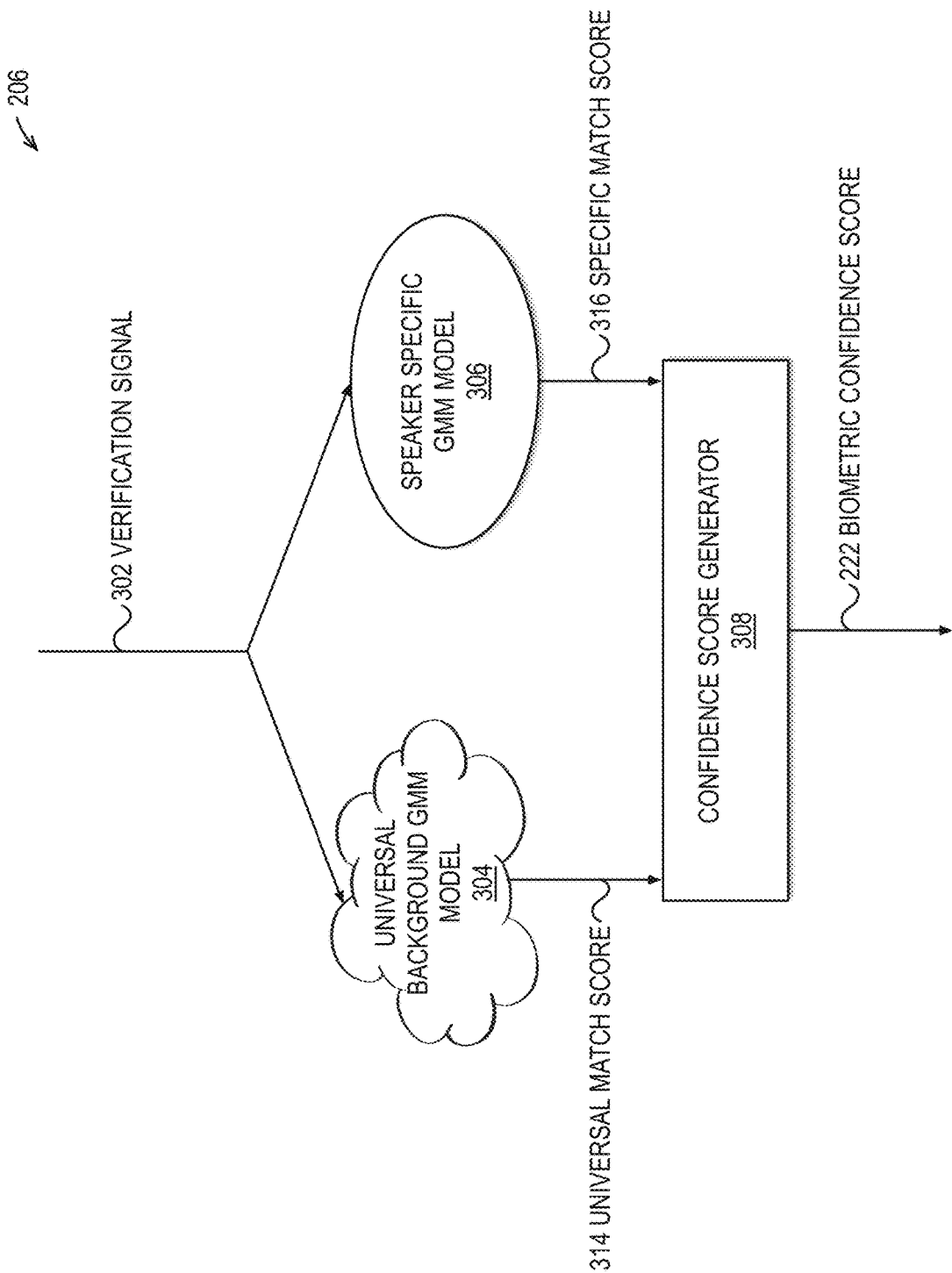
FIG. 3 is an example of a voice biometric processing block of FIG. 2 in accordance with embodiments of the present disclosure.

FIG. 3 shows an example of a voice biometric processing block 206 of FIG. 2 in accordance with embodiments of the present disclosure. The voice biometric scoring may be viewed as a form of speaker verification. The voice biometric processing block 206 includes a universal background Gaussian Mixture Model (GMM) 304, a speaker specific GMM 306 and a confidence/likelihood score generator 308. The speaker specific GMM 306 is a model that represents person-dependent speech characteristics. The speaker specific GMM 306 is trained with speech samples from an enrolled speaker to represent specific speech characteristics, e.g., indications of different vocal tract length, of the enrolled speaker, such as the inhabitant of a home having a device that includes a voice interface such as voice interface 200 of FIG. 2. That is, the speaker specific GMM 306 stores signatures of enrolled talkers. In contrast, the universal background GMM is a model that represents person-independent speech characteristics. The universal background GMM 304 is trained with speech samples from a large set of speakers to represent general speech characteristics.

A verification signal 302, which is an unknown speech sample from one of the asynchronous microphone outputs, is provided to both the universal background GMM 304 and to the speaker specific GMM 306. The speaker specific GMM 306 generates a specific match score 316 indicating the likelihood that the verification signal 302 is from the enrolled speaker. In one embodiment, the speaker specific GMM 306 generates a specific match score 316 for each of the enrolled speakers, and the confidence score generator 308 selects the specific match score 316 with the highest value. The universal background GMM 304 generates a match score indicating the likelihood that the verification signal 302 is speech of a human speaker. The confidence score generator 308 generates the biometric confidence score 222 of FIG. 2 based on the degree of confidence indicated by the two match scores 314 and 316. In one embodiment, the confidence score generator 308 employs a likelihood ratio test formed between the two match scores 314 and 316. Thus, for example, because of the room response and/or because the enrolled talker is far away from a given device, the signal-to-noise ratio (SNR) may be poor, and the confidence score for the microphone of the device may be low, which case the microphone may be pruned out and not included in the subset of microphones used in spatial processing. Although an embodiment of voice biometric scoring has been described that employs a universal background and a speaker specific GMM, other embodiments are contemplated that generate a confidence score for a microphone output sample using stored characteristics of enrolled talkers.

Figure 4:
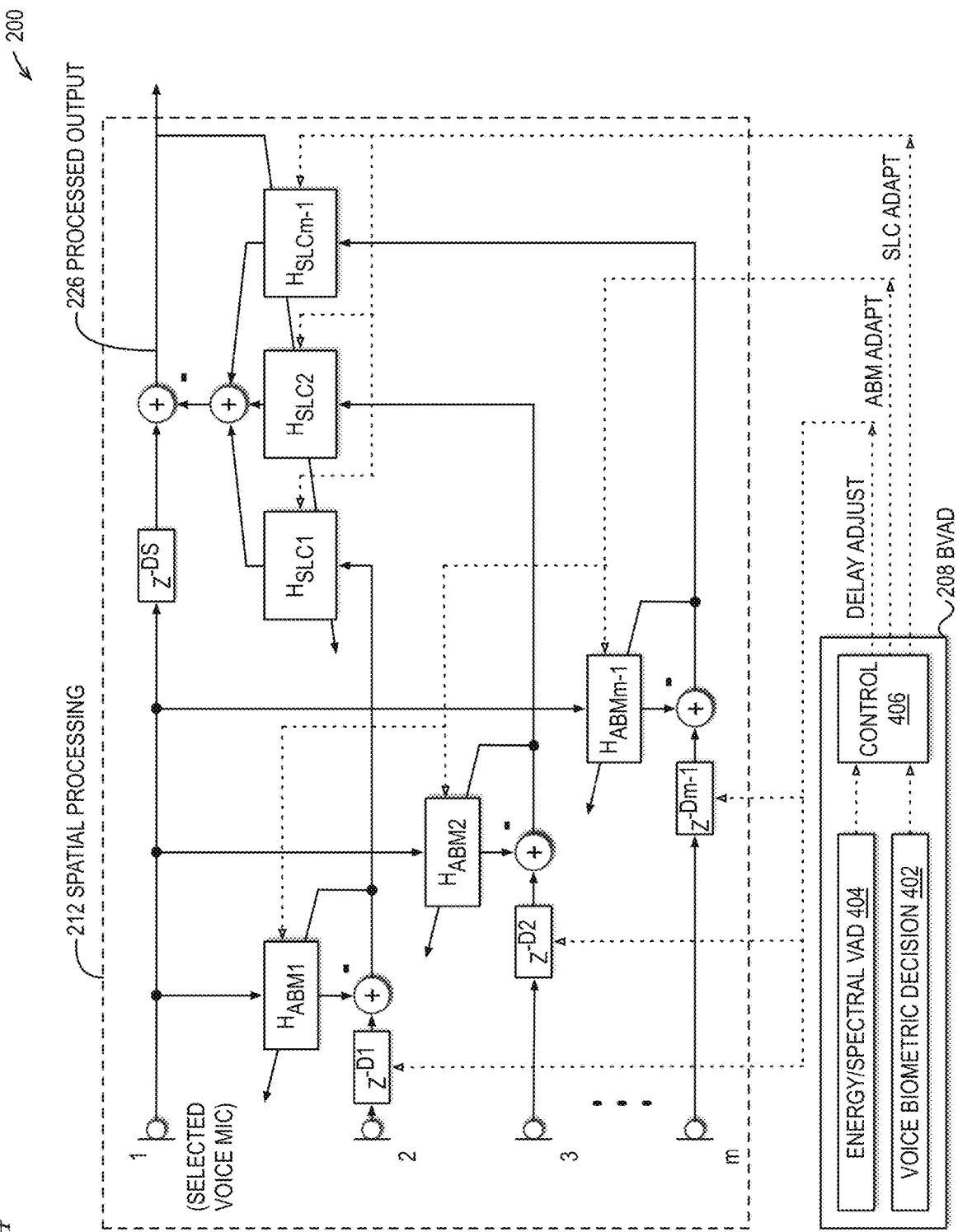
FIG. 4 is an example of portions of the voice interface of FIG. 2 that operate as a multi-microphone beamformer in accordance with embodiments of the present disclosure.

FIG. 4 is an example of portions of the voice interface 200 of FIG. 2, namely the BVAD 208 and spatial processing block 212, that operate as a Generalized Side Lobe Canceler (GSC) multi-microphone beamformer in accordance with embodiments of the present disclosure. The voice interface 200 includes the pruned subset of M asynchronous microphones, denoted 1, 2, 3 through m, of FIG. 2, e.g., of the various devices of FIG. 1A, 1B, or 1C. Microphone 1 is the selected voice microphone, or primary microphone, for speech processing, and the remaining m−1 microphones are used for generating noise references. The microphones receive an enrolled talker's speech as well as sound from noise sources, e.g., appliances, television, etc. The voice interface 200 generates a processed output 226 which is the estimate of the enrolled talker's speech with noise substantially removed for presentation to a speech processing application, e.g., a speech recognition system (not shown). The voice interface 200 includes an adaptive blocking matrix (ABM) front end that reduces desired speech leakage in the background noise reference and a side lobe canceler (SLC) back end that adaptively cancels the background noise that is present in the selected voice microphone.

The ABM comprises multiple adaptive filters denoted $h_{ABM1}$, $h_{ABM2}$, and $h_{ABMm-1}$, each of which receives voice microphone 1 as an input and attempts to extract the enrolled talker's speech so that it may be subtracted from an associated non-voice microphone to produce the noise in the non-voice microphone signal as a noise reference. A first summing node subtracts the output of filter $h_{ABM1}$ from a delayed version of microphone 2 produced by a first delay element. The output of the first summing node is a noise reference that is used to adapt filter $h_{ABM1}$. A second summing node subtracts the output of filter $h_{ABM2}$ from a delayed version of microphone 3 produced by a second delay element. The output of the second summing node is a noise reference that is used to adapt filter $h_{ABM2}$. A third summing node subtracts the output of filter $h_{ABMm-1}$ from a delayed version of microphone m produced by a third delay element. The output of the third summing node is a noise reference that is used to adapt filter $h_{ABMm-1}$. Generally, the function of the ABM is to block the talker's speech and generate the noise references for the SLC.

The ABM filters are controlled by a control signal ABM ADAPT generated by control logic 406 of the BVAD 208. The BVAD 208 includes an energy/spectral VAD 404 that generates an indication of speech present in the microphone outputs. The BVAD 208 also includes a voice biometric decision 402 that generates an indication of speech of an enrolled talker present in the microphone outputs. In one embodiment, the indication value is either a biometric ID of an enrolled speaker or is a predetermined non-biometric ID value that indicates the speech is not of an enrolled talker. Speech from a non-enrolled talker may be present, e.g., from a TV, that may cause the energy/spectral VAD 404 to generate an indication that speech is present in the microphone outputs. However, it is desirable to treat the TV speech as speech noise and remove it from the voice microphone 1 output. Advantageously, the voice biometric decision 402 indication enables the BVAD 208 to distinguish instances in which speech of an enrolled talker is present from instances in which only speech noise is present, e.g., speech from a TV is present but not from an enrolled talker. The control logic 406 controls the ABM adaptive filters to adapt only in instances in which an enrolled talker's speech is present, which may enable the effective removal of speech noise (e.g., from a TV) from the voice microphone 1 output so that the speech noise is not present in the processed output 226.

The SLC comprises multiple adaptive filters denoted $H_{SLC1}$, $H_{SLC2}$, and $H_{SLCm-1}$, which receive the noise references as an input from the respective ABM summation nodes. A fourth summing node sums the outputs of adaptive filters $H_{SLC1}$, $H_{SLC2}$, and $H_{SLCm-1}$. A fifth summing node subtracts the output of the fourth summing node from a delayed version of the selected voice microphone 1 signal to generate the processed output 226 that is used to adapt the SLC filters. The control logic 406 controls the SLC adaptive filters, via a control signal SLC ADAPT, to adapt only when the enrolled talker's speech is not present. The SLC uses the noise generated by the ABM and cancels the noise from the voice microphone 1 signal. In this manner, the spatial processing block 212 provides a signal-to-noise ratio (SNR) improvement in the processed output 226.

Varying delays between different data acquisition units can be handled by appropriate delay that encompasses all possible device specific delays. The adaptive filter architecture models the delay accordingly. In one embodiment, the respective delays of the delay elements may be adjusted based on the confidence scores 222 associated with each of the M pruned microphone outputs in order to approximate synchronization of the asynchronous microphone outputs. For example, the confidence score 222 may be inversely proportional to (or related in another manner to) the distance of the microphone from the enrolled talker, and the delay introduced on a non-voice microphone output may be adjusted inversely proportionally to the confidence score 222 of the non-voice microphone relative to the confidence score 222 of the voice microphone.

Figure 5:
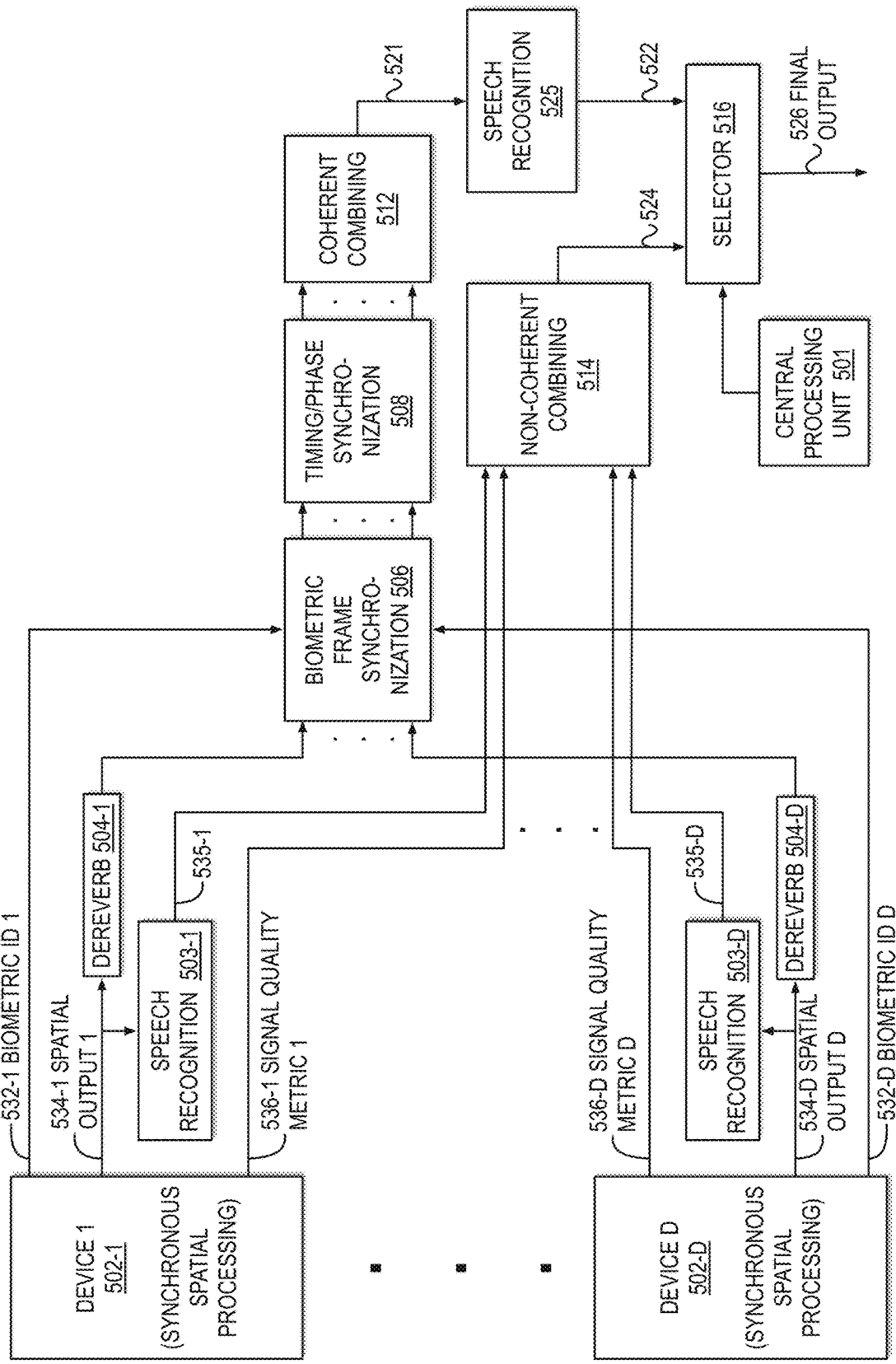
FIG. 5 is an example of a hybrid system in which multiple synchronous microphone arrays are grouped in clusters that are distributed in an ad-hoc fashion in accordance with embodiments of the present disclosure.

FIG. 5 is an example of a hybrid system 500 in which multiple synchronous microphone arrays are grouped in clusters that are distributed in an ad-hoc fashion in accordance with embodiments of the present disclosure. For example, such a scenario may arise if multiple voice assistant devices, each having its own synchronous microphone array, are distributed in different rooms around the house.

The microphones on each individual device 502 are synchronized with one another but are asynchronous with respect to microphones on other devices 502. Each device 502 uses its array of synchronous microphone outputs to produce a noise enhanced spatial output 534, a biometric identifier 532, and a signal quality metric 536. The biometric identifier 532 identifies the enrolled talker and may be generated by a block such as block 402 of FIG. 4, for example. The noise enhanced spatial output 534 is a result of spatial processing of the device's 502 array of synchronous microphone outputs, e.g., similar to the manner described with respect to FIG. 4, that effectively represents the associated device's 502 best attempt at a data stream that significantly includes the speech of an enrolled talker, if present, and excludes speech noise in order to increase speech recognition rate of enrolled talkers, for example. Preferably, the spatial processing by the device 502 includes the use of biometric information similar to aspects described above with respect to FIG. 4, e.g., adapting noise reference signal-generating filters (e.g., ABM filters) only in instances in which an enrolled talker's speech is present, and adapting noise reducing filters that use the noise reference signals (e.g., SLC filters) only in instances in which an enrolled talker's speech is absent, the presence or absence being determined using biometric information. The signal quality metric 536 indicates the confidence level in the quality of the noise enhanced spatial output 534 that is used to make a decision about the speech being uttered, i.e., to recognize the speech, as described in more detail below. In one embodiment, the signal quality metric 536 is a SNR of the associated noise enhanced spatial output 534. In one embodiment, one or more of the devices 502 may include a GSC beamformer similar to that described with respect to FIG. 4, except the microphone outputs spatially processed by the device 502 are synchronous with respect to one another and their locations relative to one another are known, i.e., they are not ad hoc. Each device 502 may include a BVAD 208 similar to that of FIG. 4 that uses voice biometric cues to enhance spatial processing of the synchronous microphone outputs to generate the noise enhanced spatial output 534, e.g., uses the voice biometric cues to determine when to adapt the adaptive filters of the beamformer.

With respect to non-coherent combining, speech recognition blocks 503 receive the spatial outputs 534 and responsively generate respective decisions of speech uttered 535. The uttered speech 535 may be a word or a collection of words that make up a phrase. In one embodiment, the speech recognition 503 may be performed by a device 502, whereas in another embodiment the speech recognition 503 may be performed a cloud server. The uttered speech 535 associated with each device 502 is provided to the non-coherent combining block 514. The non-coherent combining block 514 also receives the signal quality metric 536 from each device 502. The non-coherent combining block 514 non-coherently combines the uttered speech outputs 535 of the different devices 502 to produce a non-coherently combined output 524 that is provided to a selector 516. The selector 516 selects either the non-coherently combined output 524 or a coherently combined output 522 (described below) as a final output 526. In one embodiment, a central processing unit 501 (e.g., digital signal processor (DSP), microcontroller, etc.) controls the selector 516 as well as other power-up configurations.

The non-coherent combiner 514 includes combining logic that produces the non-coherently combined output 524. In one embodiment, the combining logic is based on selective combining in which the uttered speech 535 with the highest confidence level indicated by the signal quality metric 536 is selected as the non-coherently combined output 524. In an alternate embodiment, the non-coherent combiner 514 uses majority logic to choose the uttered speech 535 that appears the most frequently. In one embodiment, if there is no majority for a given word of the uttered speech, the combining logic may default to selective combining for the word.

Figure 6:
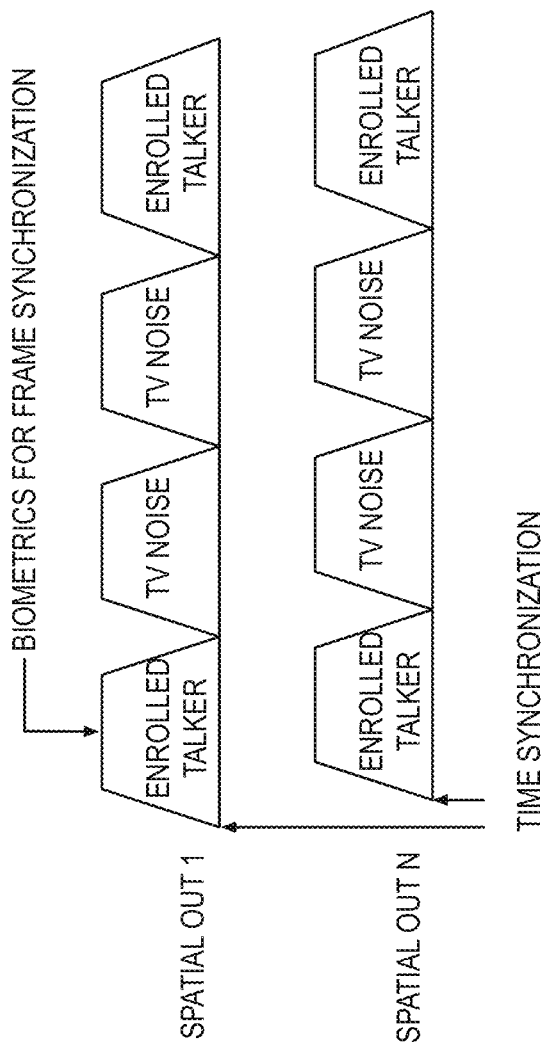
FIG. 6 is an example of a timing diagram that illustrates synchronization of the processed outputs of the multiple synchronous microphone arrays of FIG. 5.

With respect to coherent combining, the noise enhanced spatial output 534 from each device 502 is processed through a de-reverberation filter 504 to remove room artifacts associated with the channel between the enrolled talker and the device 502. Biometric frame synchronization 506 is performed using the biometric identifier 532 associated with each of the devices 502 to synchronize the audio frames on each of the spatial outputs 534 with respect to the enrolled talker, as shown in FIG. 6. That is, the biometric frame synchronization block 506 takes the audio frames of the de-reverberated noise enhanced spatial outputs 534 of the D devices 502 and aligns audio frames that include the same speech of the enrolled talker with one another and aligns audio frames that do not include speech of the enrolled talker with one another. Once frame synchronization is achieved, timing/phase synchronization 508 is performed on the synchronized frames using phase equalization to reduce timing and phase errors, as shown in FIG. 6. That is, after the audio frames are synchronized using the biometric identifiers 532, the phase errors between the synchronized audio frames are timing/phase synchronized by the timing/phase synchronization block 508 (e.g., using one of various well-known phase delay extraction techniques) that extracts delay between the various devices 502 due to the differences in their ad hoc locations.

Once the frames are properly phase adjusted, they are summed up by the coherent combining block 512 to generate a coherently combined audio output 521. A speech recognition block 525 performs speech recognition on the combined audio output 512 to generate the coherently combined output 522, which is a decision of speech uttered. In one embodiment, the speech recognition 525 may be performed by a device 502, whereas in another embodiment the speech recognition 525 may be performed a cloud server. The coherently combined output is provided to the selector 516. The selected final output 526, i.e., the selected coherently combined output 522 or non-coherently combined output 524, is then passed on to the proper signal block for downstream speech processing.

The main objective of coherent combing is to synchronize the data streams, i.e., spatial outputs 534, of the D spatial outputs 534 such that they may be summed together before producing a decision of uttered speech, e.g., coherently combined output 522. Synchronizing the data streams may have the effect of increasing the total SNR of the signal before a final decision is made because the synchronized speech of the enrolled talker may be constructively added while the asynchronous noise may be destructively added resulting in an enhanced coherently combined spatial output 521, which may increase the speech recognition rate of the coherently combined output 522 and the final output 526. The non-coherent combining 514 does not require synchronization and may be less complex than the coherent combining 512. The non-coherently combined output 524 may be suitable for automatic speech recognition but may be less suitable for other voice processing applications, whereas the coherently combined output 522 may be suitable for both.

It is noted that one or more processors may be programmed to perform the various functions described herein, including voice biometric processing, microphone pruning, spatial processing, voice activity detection, biometric frame synchronization, spatial output combining, etc. The processor can be implemented using one or more programmable integrated circuits including digital signal processors (DSPs), controllers, microcontrollers, microprocessors, hardware accelerators, configurable logic devices (e.g., field programmable gate arrays), and/or other programmable integrated circuits that are programmed to carry out the described functions. Further, the one or more processors can execute instructions stored in a non-transitory tangible computer-readable medium to perform the described functions. In addition, data storage devices can be implemented as any desired non-transitory tangible medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums. The memory can be any data storage medium configured to maintain data storage when powered. It is still further noted that the functional blocks, components, systems, devices, and/or circuitry described herein can be implemented using hardware, software, or a combination of hardware and software. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method, comprising:
   receiving multiple asynchronous audio outputs from multiple microphones distributed at ad hoc locations;
   performing voice biometrics scoring to generate a confidence score for each of the multiple asynchronous audio outputs, wherein the confidence score indicates a likelihood of speech utterance of an enrolled user in the asynchronous audio output;
   selecting a subset of the multiple asynchronous audio outputs based on the confidence scores; and
   performing spatial processing of the selected subset of the multiple asynchronous audio outputs to provide processed audio output for use by a voice application.

2. The method of claim 1, wherein said selecting a subset of the multiple asynchronous audio outputs is based on a comparison of the confidence score to a threshold.

3. The method of claim 1, wherein said performing spatial processing comprises applying a respective delay to one or more of the selected subset of the multiple asynchronous audio outputs based on the confidence scores.

4. The method of claim 1, wherein said performing spatial processing comprises using the confidence scores to control adaptation of filters that generate noise references from pairs of the selected subset of the multiple asynchronous audio outputs.

5. The method of claim 4, wherein the adaptation of the noise reference generating filters is performed when the confidence scores indicate a high likelihood of a presence of speech of an enrolled talker.

6. The method of claim 4, wherein said performing spatial processing comprises using the confidence scores to control adaptation of second filters that use the noise references to reduce noise from a primary one of the selected subset of the multiple asynchronous audio outputs.

7. The method of claim 6, wherein the adaptation of the second filter is performed when the confidence scores indicate a low likelihood of a presence of speech of an enrolled talker.

8. The method of claim 1,
   wherein the voice application comprises a speech recognition application.

9. The method of claim 1, wherein a centralized processing unit receives the multiple asynchronous audio outputs via short range communication and performs said voice biometrics scoring, said selecting a subset of the multiple asynchronous audio outputs, and said spatial processing.

10. The method of claim 1, wherein the multiple microphones are included in respective multiple devices, wherein the multiple devices transmit the multiple asynchronous audio outputs to one another via short range communication, and wherein one or more of the multiple devices performs said voice biometrics scoring, said selecting a subset of the multiple asynchronous audio outputs, and said spatial processing.

11. A method, comprising:
    receiving an asynchronous plurality of spatially processed audio outputs and a corresponding plurality of biometric identifiers from a corresponding plurality of devices that are distributed at ad hoc locations;
    synchronizing audio frames of the asynchronous plurality of spatially processed audio outputs using the plurality of biometric identifiers; and combining the synchronized audio frames to generate a coherently combined audio output for use by a voice application.

12. The method of claim 11, further comprising:
performing time synchronization on the synchronized audio frames before said combining the synchronized audio frames.

13. The method of claim 11,
wherein one or more of the received asynchronous plurality of spatially processed audio outputs is generated by the corresponding one or more plurality of devices by adapting noise reference signal-generating filters only in instances in which an enrolled talker's speech is present and by adapting noise reducing filters using the noise reference signals only in instances in which the enrolled talker's speech is absent; and
wherein the presence and absence are determined using biometric information of the enrolled talker.

14. The method of claim 11, further comprising:
wherein the voice application comprises a speech recognition application.

15. A method, comprising:
receiving a plurality of uttered speech associated with a respective plurality of devices that are distributed at ad hoc locations within a home;
wherein the plurality of uttered speech is recognized from a respective plurality of spatially processed outputs generated by the respective plurality of devices using biometrics of talkers enrolled by the plurality of devices;
combining the plurality of uttered speech to generate a final output of uttered speech; and
receiving a plurality of signal quality metrics respectively associated with the plurality of uttered speech;
wherein said combining the plurality of uttered speech to generate the final output of uttered speech comprises:
using the plurality of signal quality metrics to select one of the plurality of uttered speech as the final output of uttered speech.

16. The method of claim 15,
wherein said combining the plurality of uttered speech to generate the final output of uttered speech comprises:
choosing as the final output of uttered speech that which appears the most frequently among the plurality of uttered speech.

17. The method of claim 16,
receiving a plurality of signal quality metrics respectively associated with the plurality of uttered speech; and
wherein said combining the plurality of uttered speech to generate the final output of uttered speech comprises:
using the plurality of signal quality metrics to select one of the plurality of uttered speech as the final output of uttered speech when none of the plurality of uttered speech appears the most frequently.

18. The method of claim 15,
wherein at least one of the plurality of devices performs speech recognition on the respective spatially processed output to generate the associated uttered speech.

19. The method of claim 15,
wherein at least one of the plurality of devices sends the respective spatially processed output to a cloud server to generate the associated uttered speech.

20. A non-transitory computer-readable storage medium having computer-executable instructions stored thereon that, when executed by processor circuitry, cause the processor circuitry to perform a method comprising:
receiving multiple asynchronous audio outputs from multiple microphones distributed at ad hoc locations;
performing voice biometrics scoring to generate a confidence score for each of the multiple asynchronous audio outputs, wherein the confidence score indicates a likelihood of speech utterance of an enrolled user in the asynchronous audio output;
selecting a subset of the multiple asynchronous audio outputs based on the confidence scores; and
performing spatial processing of the selected subset of the multiple asynchronous audio outputs to provide processed audio output for use by a voice application.

21. A method, comprising:
receiving a plurality of uttered speech associated with a respective plurality of devices that are distributed at ad hoc locations within a home;
wherein the plurality of uttered speech is recognized from a respective plurality of spatially processed outputs generated by the respective plurality of devices using biometrics of talkers enrolled by the plurality of devices;
combining the plurality of uttered speech to generate a final output of uttered speech;
wherein said combining the plurality of uttered speech to generate the final output of uttered speech comprises:
choosing as the final output of uttered speech that which appears the most frequently among the plurality of uttered speech; and
receiving a plurality of signal quality metrics respectively associated with the plurality of uttered speech;
wherein said combining the plurality of uttered speech to generate the final output of uttered speech comprises:
using the plurality of signal quality metrics to select one of the plurality of uttered speech as the final output of uttered speech when none of the plurality of uttered speech appears the most frequently.

* * * * *